United States Patent
Kirkegaard

(10) Patent No.: US 9,494,135 B2
(45) Date of Patent: Nov. 15, 2016

(54) WIND TURBINE BLADE WITH A BLADE ATTACHMENT

(71) Applicant: Siemens Aktiengesellschaft, München (DE)

(72) Inventor: Jeppe Funk Kirkegaard, Herning (DK)

(73) Assignee: SIEMENS AKTIENGESELLSCHAFT, München (DE)

(*) Notice: Subject to any disclaimer, the term of this patent is extended or adjusted under 35 U.S.C. 154(b) by 400 days.

(21) Appl. No.: 14/085,104

(22) Filed: Nov. 20, 2013

(65) Prior Publication Data
US 2014/0140854 A1 May 22, 2014

(30) Foreign Application Priority Data
Nov. 21, 2012 (EP) .................................... 12193617

(51) Int. Cl.
F03D 1/06 (2006.01)

(52) U.S. Cl.
CPC ............ F03D 1/0675 (2013.01); F03D 80/00 (2016.05); F05B 2230/80 (2013.01); F05B 2280/6012 (2013.01); Y02E 10/721 (2013.01); Y02P 70/523 (2015.11)

(58) Field of Classification Search
CPC .... F03D 1/0675; F03D 80/00; F03D 1/0683; F05B 2280/6012; F05B 2230/80
See application file for complete search history.

(56) References Cited

U.S. PATENT DOCUMENTS

| | | | | |
|---|---|---|---|---|
| 7,901,189 B2* | 3/2011 | Gupta | .................. | F03D 1/0675 416/230 |
| 8,459,947 B2* | 6/2013 | Stege | ..................... | F03D 1/065 416/224 |
| 2008/0286110 A1* | 11/2008 | Gupta | .................. | F03D 1/0675 416/241 A |
| 2011/0031759 A1* | 2/2011 | Mitsuoka | .............. | F03D 1/0675 290/55 |
| 2012/0121430 A1* | 5/2012 | Olsen | .................... | F03D 1/0675 416/241 R |
| 2012/0196079 A1* | 8/2012 | Brauers | ..................... | B32B 5/18 428/116 |
| 2012/0230832 A1* | 9/2012 | Stege | ..................... | F03D 1/065 416/228 |

FOREIGN PATENT DOCUMENTS

| EP | 2182203 A2 | 5/2010 |
|---|---|---|
| EP | 2444657 A1 | 4/2012 |
| EP | 2497942 A1 | 9/2012 |

* cited by examiner

Primary Examiner — Igor Kershteyn
Assistant Examiner — Eldon Brockman

(57) ABSTRACT

A wind turbine blade with a blade attachment is provided. A tip end of the wind turbine blade is connected with the blade attachment by a glue-interface. The glue-interface is arranged between the tip end of the blade and the blade attachment. The glue-interface is arranged in a circumferential manner in view to the tip end of the blade and in view to the blade attachment. The blade attachment includes a core with a surface, while the core is surrounded by this surface.
The blade attachment, which comprises the core and the surface, is completely made of one foam, showing at least two different densities. That part of the surface of the core, which is arranged adjacent to the glue-interface, is made of foam with a first density, while the chosen first density prevents the infusion of water from the glue-interface into the core.

7 Claims, 2 Drawing Sheets

WIND TURBINE BLADE WITH A BLADE ATTACHMENT

CROSS REFERENCE TO RELATED APPLICATIONS

The present application claims priority to European Patent Office application No. 12193617.3 EP filed Nov. 21, 2012, the entire content of which is hereby incorporated herein by reference.

FIELD OF INVENTION

The invention relates to a wind turbine blade with a blade attachment.

BACKGROUND OF INVENTION

Blade attachments are known from the prior art. They are often used to retrofit blades, which are already manufactured.

The blade attachment might be designed as an extension unit, which is used to prolong the length of the blade. The blade attachment might be designed as a winglet, which is used to change the aerodynamic characteristics of the wind turbine blade.

Blade attachments are used to adapt wind turbine blades to site-specific requirements for example.

Blade attachments are even used to prolong standardized blades if needed thus the efforts and complexities in blade-manufacturing tools and costs are reduced.

According to the prior art known the blade attachment overlaps a specified section of the wind turbine blade. The specified section is used for a glue-connection between the blade and its attachment thus a sufficient structural integration and connection of the two parts is reached.

FIG. 2 shows a blade attachment BA as known from the prior art.

The blade attachment BA is designed and prepared to prolong a blade (not shown here) in its length thus it is shaped and used as an extension unit of the blade.

The blade attachment BA comprises a core CO, which is made of foam or which is made of Balsa-wood for example.

The core CO is surrounded by a shell of a lamination LA, which preferably comprises a fiber reinforced lamination LA.

The lamination LA may comprise glass-fibers or glass-fiber-reinforced structures.

The core CO and the lamination LA are preferably connected by a matrix material like resin. The resin is preferably applied to the core-lamination-structure by help of a "vacuum assisted resin transfer moulding, VARTM"-process or VARTM abbreviated.

FIG. 3 shows a blade attachment BA as described in FIG. 2, which is connected to the tip end TE of a blade BL by help of glue.

The glue applied defines a glue-interface GI, which is between the tip end TE of the blade BL and the blade attachment BA.

The glue-interface GI is circumferential in view to the tip end TE of the blade BL and in view to the blade attachment BA. Thus the glue-interface GI is used as an environmental seal. Due to the environmental seal water infusion WI in the blade attachment BA is avoided or reduced at least.

Due to expected and long life cycle of wind turbine blades, which is 20 years or more, the glue-interface GI might get weaker over time.

Thus water WA might infuse the blade attachment BA. Due to the centrifugal forces of the rotating wind turbine blade BL the water WA moves through the porous core material to the tip end TEBA of the blade attachment BA.

The water WA typically accumulates within the blade attachment BA at its tip end TEBA. The water WA typically gathers within the porous material of the core CO.

The water is "trapped" at this position as the laminate LA surrounds the core CO like a shell SH.

At cold wind turbine sites the water WA might be turned into ice, thus cracks might be introduced into the shell SH.

The blade BL of the wind turbine and even its blade attachment BA is exposed to lightning strikes, thus the water WA might be turned into steam, resulting in a destroyed tip end TEBA of the blade attachment.

SUMMARY OF INVENTION

It is therefore the aim of the invention, to provide an improved blade attachment of a wind turbine blade, which is prepared for a glue-connection but which avoids that water gathers within the blade attachment at its tip end.

This aim is reached by the features of the claims. Preferred configurations are addressed and described by the dependent claims.

The invention relates to a wind turbine blade (BL) with a blade attachment (BA) and to the blade attachment (BA).

A tip end of the wind turbine blade is connected with the blade attachment by a glue-interface. The glue-interface is arranged between the tip end of the blade and the blade attachment.

The glue-interface is arranged in a circumferential manner in view to the tip end of the blade and in view to the blade attachment.

The blade attachment comprises and consists of a core and a surface. The core is surrounded by the surface like a shell, resulting in the blade attachment.

The blade attachment, which comprises the core and the surface, is completely made of one foam material. The foam shows at least two different densities.

That part of the surface of the core, which is arranged adjacent to the glue-interface, is made of the foam with a first density, while the chosen first density prevents the penetration of water from the glue-interface into the core.

In a preferred configuration a center of the core is made of the foam showing a second density.

The numerical value of the first density of the foam exceeds the numerical value of the second density of the foam. Thus the penetration of water from the glue-interface into the core and the infusion of water within the core (CO) are prevented.

In a preferred configuration the numerical value of the first density decreases continuously towards the numerical value of the second density. Thus the foam with the second density is arranged in the center of the core.

In a preferred configuration the second density of the foam is chosen in a way that the overall weight of the core and thus the overall weight of the blade attachment is minimized.

In a preferred configuration the blade attachment is an extension unit, being used to prolong the blade in its length.

In another preferred configuration the blade attachment is a winglet, being used to change the aerodynamic characteristics of the blade.

In a preferred configuration the blade attachment comprises a cavity, which is prepared and arranged to incorporate at least a part of the tip end of the blade. Thus the blade attachment is connected to the tip-end of the blade in a form-fitted manner.

In a preferred configuration the blade attachment might be reinforced by a lamination. Thus the stiffness and the live-time of the blade attachment are enhanced and improved.

In a preferred configuration the lamination comprises glass fibers in a suitable form and shape, like short fibers, long fibers or mats or the like.

In a preferred configuration the blade attachment (comprising the core and the surface of the core) is preferably manufactured in one piece by help of a so called "Reaction Injection Moulding, RIM"-process.

Within this RIM-process a closed mould system is used to shape, form and manufacture the blade attachment. Two components are injected into the closed mould system. The injection is preferably done at a low pressure. Both components start to react with each other and the result of the reaction fills as foam the closed mould system. Thus the blade attachment is formed and shaped by the closed mould system.

Preferably polyurethane or the like are used within this RIM-process.

The RIM-process allows the production of a blade attachment showing a high-density skin or a high-density surface of the blade attachment.

Another preferred method to manufacturing the blade attachment in one piece is the so called "Structural Foam Moulding, SFM"-process.

The SFM-process differs from the RIM-process: a foam structure is created by a thermoplastic material, like high-density-polyethylene (HDPE). The HDPE is exposed to an inert gas or to a blower agent, thus the HDPE reacts with them, resulting in the foam structure. The foam structure is formed and shaped by a closed mould system, too.

The machinery and tools, being needed for the SFM-process, are more expensive than those of the RIM-process but they are suited for larger production runs.

The RIM-process and the SFM-process result in a blade attachment, which show different foam densities within its structure.

According to the invention the whole blade attachment, comprising the core and its surface, is completely made by a single foam material showing different densities.

The whole blade attachment shows no borderlines within the core or between the core and its surface as the densities change continuously from the first and maximum density at the skin towards the second and minimum density at the inner core or center core.

The chosen different densities show no abrupt changes thus the blade attachment core shows no weak spots and no weak borderlines which could be used by water for penetration and/or infusion.

There are no internal cavities inside the core thus there is no accumulation of water within the core.

The blade attachment invented is quite robust thus the live cycle of an overall wind turbine blade, which comprises a "basic" wind turbine blade and its blade attachment, is prolonged.

The blade attachment invented allows retrofitting of an already mounted wind turbine blade at the site of the wind turbine in an easy and cheap manner.

The high-density skin provides a majority of strength and stiffness of the blade attachment.

The core with the varying densities provides a resistant part of the blade attachment with a low overall mass—there is no cavity inside the core.

The continuous change of the densities results in a quite strong boundary zone, thus the penetration of water into the core and the gathering of water within the core is avoided.

Due to the strong boundary zone and due to the strong skin the whole blade attachment shows a quite high compression strength. Thus the glue-connection of the blade attachment to the tip end of the blade is quite easy as pressure can be applied to the blade attachment and thus to the glue-connection without any problems.

The skin density (the maximum density) might be chosen within a range of 800-1300 kg/m3 while the density of the inner core (the minimum or low density) might be chosen within a range of 200-400 kg/m3.

BRIEF DESCRIPTION OF THE DRAWINGS

The invention is shown schematically by help of figures.

FIG. 1 shows a wind turbine blade with a blade attachment according to the invention, while

DETAILED DESCRIPTION OF INVENTION

Figure 1:
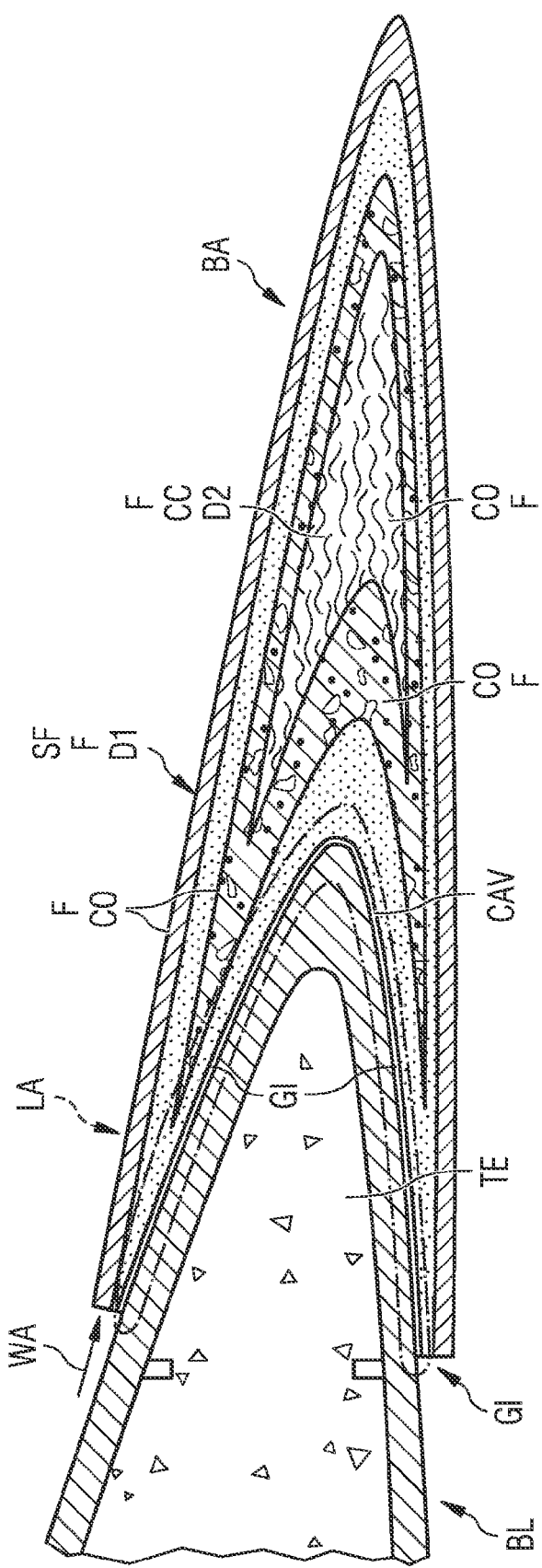
Figure 2:
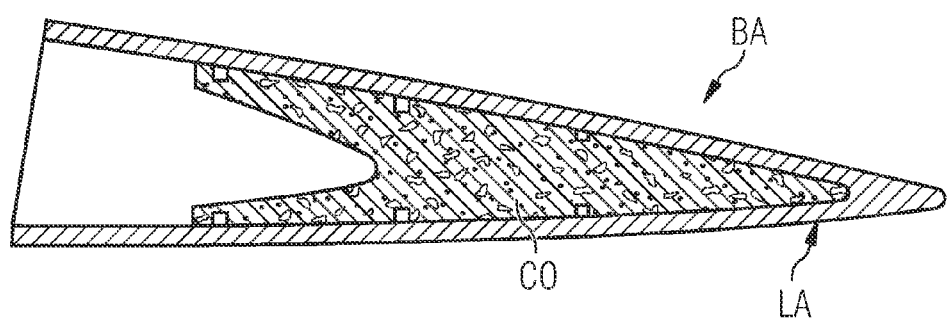
FIG. 2 and FIG. 3 show prior art blade attachments as described in the introduction of his application.
Figure 3:
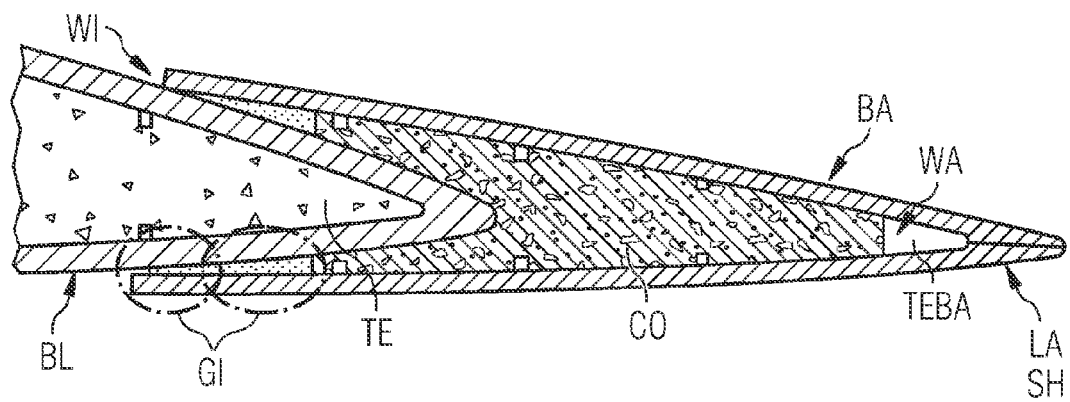

FIG. 1 shows a wind turbine blade BL with a blade attachment BA according to the invention.

A tip end TE of the wind turbine blade BL is connected with the blade attachment BA by a glue-interface GI.

The glue-interface is arranged between the tip end TE of the blade BL and the blade attachment BA. Thus the glue-interface GI is arranged in a circumferential manner in view to the tip end TE of the blade BL and in view to the blade attachment BA.

The blade attachment BA comprises a core CO with a surface SF. Thus the core CO is surrounded by the surface SF.

The core CO is completely made of a foam F, showing at least two different densities D1 and D2.

That part of the surface SF of the core CO, which is arranged adjacent to the glue-interface GI, is made of the foam F, which shows a first density D1.

This chosen first density D1 prevents the infusion of water WA from the glue-interface GI into the core CO.

A center CC of the core CO is made of the foam F showing a second density D2.

The numerical value of the first density D1 of the foam F exceeds the numerical value of the second density D2 of the foam, thus the infusion of water WA from the glue-interface GI into the core CO and the penetration of water WA within the core CO are prevented.

The numerical value of the first density D1 decreases continuously towards the numerical value of the second density D2. Thus the foam with the second density D2 is arranged in the center CC of the core CO.

The second density F2 of the foam is chosen in a way that the overall weight of the core CO is minimized.

The blade attachment BA comprises a cavity CAV, which is prepared and arranged to incorporate at least a part of the tip end TE of the blade BL.

The blade attachment BA might be reinforced by a lamination LA.

I claim:

1. A wind turbine blade, comprising:
a blade attachment including a core and a first surface while the core is surrounded by the first surface,
wherein a tip end of the wind turbine blade is connected with the blade attachment by a glue-interface,
wherein the glue-interface is arranged between the tip end of the blade and the blade attachment and wherein the glue-interface is arranged in a circumferential manner in view to the tip end of the blade and in view to the blade attachment,
wherein the blade attachment, which comprises the core and the first surface, is completely made of one foam, while the foam shows at least two different densities,
wherein a second surface of the core, which is arranged adjacent to the glue-interface, is made of foam, which shows a first density, and
wherein the chosen first density prevents the penetration of water from the glue-interface into the core,
wherein a center of the core is made of foam showing a second density,
wherein the numerical value of the first density of the foam exceeds the numerical value of the second density of the foam, thus the penetration of water from the glue-interface into the core and the infusion of water within the core are prevented, and
wherein the numerical value of the first density decreases continuously towards the numerical value of the second density, while the foam with the second density is arranged in the center of the core.

2. The wind turbine blade according to claim 1, wherein the blade attachment is an extension unit, being used to prolong the blade in its length.

3. The wind turbine blade according to claim 1, wherein the blade attachment is a winglet, being used to change the aerodynamic characteristics of the blade.

4. The wind turbine blade according to claim 1, wherein the blade attachment comprises a cavity, which is prepared and arranged to incorporate a part of the tip end of the blade.

5. The wind turbine blade according to claim 1, wherein the blade attachment is reinforced by a lamination.

6. The wind turbine blade according to claim 5, wherein the lamination comprises glass fibers in a suitable form and shape, wherein the glass fibers are selected from the group consisting of short fibers, long fibers and mats.

7. A blade attachment for a wind turbine blade, comprising:
a core and a first surface, while the core is surrounded by the first surface,
wherein the blade attachment is prepared to be connected with a tip end of a wind turbine blade by a glue-interface, while the glue-interface will be arranged in a circumferential manner in view to the tip end of the blade and in view to the blade attachment,
wherein the blade attachment, which comprises the core and the first surface, is completely made of one foam, which shows at least two different densities, and
wherein a second surface of the core, which is arranged adjacent to the glue-interface, is made of foam with a first density, while the chosen first density will prevent the penetration of water from the glue-interface into the core,
wherein a center of the core is made of foam showing a second density,
wherein the numerical value of the first density of the foam exceeds the numerical value of the second density of the foam, thus the penetration of water from the glue-interface into the core and the infusion of water within the core are prevented, and
wherein the numerical value of the first density decreases continuously towards the numerical value of the second density, while the foam with the second density is arranged in the center of the core.

* * * * *